(12) United States Patent
Marpe et al.

(10) Patent No.: US 10,659,776 B2
(45) Date of Patent: *May 19, 2020

(54) QUALITY SCALABLE CODING WITH MAPPING DIFFERENT RANGES OF BIT DEPTHS

(71) Applicant: GE VIDEO COMPRESSION, LLC, Albany, NY (US)

(72) Inventors: Detlev Marpe, Berlin (DE); Martin Winken, Berlin (DE); Heiko Schwarz, Berlin (DE); Thomas Wiegand, Berlin (DE)

(73) Assignee: GE VIDEO COMPRESSION, LLC, Albany, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/190,409

(22) Filed: Nov. 14, 2018

(65) Prior Publication Data

US 2019/0082174 A1    Mar. 14, 2019

Related U.S. Application Data (63) Continuation of application No. 15/803,310, filed on Nov. 3, 2017, now Pat. No. 10,165,269, which is a (Continued)

(51) Int. Cl.
*H04N 19/102* (2014.01)
*H04N 19/50* (2014.01)
(Continued)

(52) U.S. Cl.
CPC ......... *H04N 19/102* (2014.11); *H04N 19/117* (2014.11); *H04N 19/184* (2014.11); (Continued)

(58) Field of Classification Search
CPC .... H04N 19/102; H04N 19/36; H04N 19/187; H04N 19/184; H04N 19/50; H04N 19/117; H04N 19/61; H04N 19/30; H04N 19/186

See application file for complete search history.

(56) References Cited

U.S. PATENT DOCUMENTS 5,963,665 A   10/1999 Kim et al.
6,201,898 B1   3/2001 Takeuchi et al.
(Continued)

FOREIGN PATENT DOCUMENTS

CN    101453684 B   5/2014
EP    1617679 A2   1/2006
(Continued)

OTHER PUBLICATIONS

Davies, T. et al., "Suggestion for a Test Model", ITU-T SG16 WP 3 and ISO/IEC JTC 1/SC 29/WG 11, 1st Meeting, Document JC1VC-A033, 30 pages, Apr. 15-23, 2010.
(Continued)

*Primary Examiner* — Tracy Y. Li
(74) *Attorney, Agent, or Firm* — Pillsbury Winthrop Shaw Pittman LLP (57) ABSTRACT

A more efficient way of addressing different bit-depths, or different bit-depths and chroma sampling format requirements is achieved by using a low bit-depth and/or low-chroma resolution representation for providing a respective base layer data stream representing this low bit-depth and/or low-chroma resolution representation as well as for providing a higher bit-depth and/or higher chroma resolution representation so that a respective prediction residual may be encoded in order to obtain a higher bit-depth and/or higher chroma resolution representation. By this measure, an encoder is enabled to store a base-quality representation of a picture or a video sequence, which can be decoded by any (Continued)

legacy decoder or video decoder, together with an enhancement signal for higher bit-depth and/or reduced chroma sub-sampling, which may be ignored by legacy decoders or video decoders.

30 Claims, 4 Drawing Sheets

Related U.S. Application Data continuation of application No. 14/324,425, filed on Jul. 7, 2014, now Pat. No. 9,843,800, which is a continuation of application No. 12/447,005, filed as application No. PCT/EP2006/010297 on Oct. 25, 2006, now Pat. No. 8,774,269.

(51) Int. Cl.
| | | |
|---|---|---|
| H04N 19/30 | (2014.01) | |
| H04N 19/61 | (2014.01) | |
| H04N 19/117 | (2014.01) | |
| H04N 19/186 | (2014.01) | |
| H04N 19/184 | (2014.01) | |
| H04N 19/187 | (2014.01) | |
| H04N 19/36 | (2014.01) | |

(52) U.S. Cl.
CPC ......... *H04N 19/186* (2014.11); *H04N 19/187* (2014.11); *H04N 19/30* (2014.11); *H04N 19/36* (2014.11); *H04N 19/50* (2014.11); *H04N 19/61* (2014.11)

(56) References Cited

U.S. PATENT DOCUMENTS

| | | | |
|---|---|---|---|
| 6,829,301 | B1 | 12/2004 | Tinker et al. |
| 6,925,120 | B2 | 8/2005 | Zhang et al. |
| 7,146,059 | B1 | 12/2006 | Durand et al. |
| 7,535,383 | B2 | 5/2009 | Segall et al. |
| 7,773,694 | B2 | 8/2010 | Murakami et al. |
| 7,924,921 | B2 | 4/2011 | Crinon et al. |
| 8,249,273 | B2 | 8/2012 | Inoda et al. |
| 2002/0094125 | A1 | 7/2002 | Guo |
| 2005/0063471 | A1 | 3/2005 | Regunathan et al. |
| 2005/0105623 | A1 | 5/2005 | Linzer |
| 2005/0259729 | A1 | 11/2005 | Sun |
| 2006/0083308 | A1 | 4/2006 | Schwarz et al. |
| 2006/0197777 | A1 | 7/2006 | Cha et al. |
| 2007/0035706 | A1 | 2/2007 | Margulis |
| 2007/0160133 | A1 | 7/2007 | Bao et al. |
| 2007/0160153 | A1 | 7/2007 | Sullivan |
| 2008/0002767 | A1 | 1/2008 | Schwarz |
| 2008/0101707 | A1 | 5/2008 | Mukherjee et al. |
| 2009/0003718 | A1 | 1/2009 | Liu et al. |
| 2009/0097558 | A1* | 4/2009 | Ye .................. H04N 19/176 375/240.13 |
| 2009/0110073 | A1* | 4/2009 | Wu .................. H04N 19/30 375/240.15 |
| 2009/0225834 | A1 | 9/2009 | Song et al. |
| 2009/0297054 | A1 | 12/2009 | Regunathan et al. |
| 2010/0020866 | A1 | 1/2010 | Marpe et al. |
| 2010/0046622 | A1* | 2/2010 | Doser ................ H04N 19/105 375/240.13 |
| 2010/0220789 | A1 | 9/2010 | Yuwen et al. |
| 2012/0200669 | A1 | 8/2012 | Lai |
| 2013/0034171 | A1 | 2/2013 | Winken |
| 2014/0079132 | A1 | 3/2014 | Amon |

FOREIGN PATENT DOCUMENTS

| | | |
|---|---|---|
| EP | 1827024 A1 | 8/2007 |
| EP | 2521357 A1 | 11/2012 |
| EP | 2860977 A1 | 4/2015 |
| JP | 10056639 A | 2/1998 |
| JP | 2009-147968 A | 7/2009 |
| WO | 2004045217 A1 | 5/2004 |
| WO | 2008/043198 A1 | 4/2008 |
| WO | 2008043198 A1 | 4/2008 |
| WO | 2011046607 A2 | 4/2011 |
| WO | 2011127966 A1 | 10/2011 |
| WO | 2012020092 A1 | 2/2012 |

OTHER PUBLICATIONS

Escoda, 0. et al., "Geometry-Adaptive Block Partitioning for Video Coding", Proc. IEEE ICASSP, 2007, pp. 1-657-1-660.
Gao, J. et al., "Application of Wedgelet Transform for Image Process", Proc. IEEE ICACIA, pp. 220-222, 2008.
ITU-T Recommendation H.264, Series H: Audiovisual and Multimedia Systems, Infrastructure of Audiovisual Services—Coding of Moving Video, ISO/IEC JTC 1, 14496-10, 732 pages, Apr. 2013.
Kang, M. et al., "Adaptive Geometry-based Intra Prediction for Depth Video Coding", IEEE International Conference on Multimedia and Expo, Jul. 19, 2010, pp. 1230-1235.
Loke. K., "Wedgelets-Based Automatic Object Contour Detection". Proc. IEEE ICNC. pp. 3664-3668. 2010.
Liu, S. et al., "New Depth Coding Techniques with Utilization of Corresponding Video", IEEE Transactions on Broadcasting, vol. 57, No. 2, Jun. 2011, pp. 551-561.
Liu, S. et al., "Sparse Dyadic Mode for Depth Map Compression", Proc. IEEE ICIP, Sep. 26-29, 2010, pp. 3421-3424.
Merkle, P. et al., "3D-CE6.H Related: Fast Wedgelet Search", ITU-T SG16 WP 3 and ISO/IEC JTC 1/SC 29/WG 11, 1st Meeting, Document JCT2-A0105, 4 pages, Jul. 16-20, 2012.
Merkle, P. et al., "The Effects of Multiview Depth Video Compression on Multiview Rendering", Signal Processing: Image Communication, 24, 2009, pp. 73-88.
Merkle, P., "CE6.H Results on Simplified Wedgelet Search for DMM Modes 1 and 3", ITU-T SG16 WP 3 and ISO/IEC JTC 1/SC 29/WG 11, 2nd Meeting, Document JCT3V-B0039, 7 pages, 2012.
Morvan, Y. et al., "Novel Coding Technique for Depth Images using Quadtree Decomposition and Plane Approximation", Proc. SPIE, vol. 5960, 2005, pp. 1187-1194.
Official Communication issued in corresponding European Patent Application No. 12 783 613.8, dated Sep. 11, 2015.
Official Communication issued in corresponding International Application PCT/EP2012/072328, dated Jan. 3, 2013.
Official Communication issued in corresponding Korean Patent Application No. 10-2014-7015913, dated Jul. 29, 2015.
Official Communication issued in corresponding Korean Patent Application No. 10-2014-7015914, dated Jul. 29, 2015.
Ostermann, J., "Coding of Binary Shape in MPEG-4", ITG Fachberichte, pp. 659-662, 1997.
Smolic, A. et al., "Development of a New MPEG Standard for Advanced 3D Video Applications", Proc. IEEE ISPA, pp. 400-407, 2009.
Wakin, M. et al., "Rate-Distortion Optimized Image Compression Using Wedgelets", Proc. IEEE ICIP, pp. 111-237-111-240, 2002.
Yang, W. et al., "An MPEG-4-Compatible Stereoscopic/Multiview Video Coding Scheme", IEEE Transactions on Circuits and Systems for Video Technology, vol. 16, No. 2, pp. 286-290, 2006.
Zhang, Y. et al., "Motion Compensation Using Polyline Based Block Partition", 2nd International Congress on Image and Signal Processing, Oct. 17-19, 2009, 5 pages.
Office Action dated Sep. 22, 2016 in U.S. Appl. No. 14/273,601.
Office Action dated Sep. 21, 2016 in U.S. Appl. No. 14/273,603.
Office Action dated Dec. 15, 2016 in Chinese Application 201280066926.X.
Notice of Allowance dated Aug. 14, 2018 in U.S. Appl. No. 15/803,310.
Extended European Search Report dated Apr. 5, 2019 issued in corresponding EP Application No. 18211119.5.
Non-final Office Action U.S. Appl. No. 14/626,946 dated Nov. 8, 2018.

(56) References Cited

OTHER PUBLICATIONS

"Advanced Video Coding for Generic Audiovisual Services," ITU-T Recommendation H.264; Series H: Audiovisual and Multimedia Systems; Infrastructure of audiovisual services—Coding of moving video; Mar. 2005; 343 pages.

"Information Technology—Coding of Audio-Visual Objects—Part 2: Visual," International Organization for Standarization; Jul. 2001; 539 pages.

Conklin et al.: "Dithering 5-Tap Filter for Inloop Deblocking," XP-002308744; Joint Video Team (JVT) of ISO/IEC MPEG & ITU-T VCEG; Date Saved: May 1, 2002; pp. 1-16.

Erdem et al.: "Compression of 10-Bit Video Using the Tools of MPEG-2," XP-000495183; Signal Processing: Image Communication; vol. 7, No. 1; Mar. 1, 1995; pp. 27-56.

Liu et al., "Inter-layer Prediction for SVC Bit-depth Scalability", Joint Vide Team (JVT) of ISO/IEC MPEG & ITU-T VCEG, 24th Meeting: Geneva, CH, Jun. 26, 2007, pp. 1-12.

Marpe et al., "Quality Scalable Coding", U.S. Appl. No. 12/447,005, filed Apr. 24, 2009.

Marpe et al.: "The H.264/MPEG4 Advanced Video Coding Standard and Its Application," IEEE Communications Magazine; Aug. 2006; pp. 134-143.

Official communication issued in counterpart International Application No. PCT/EP2006/010277, dated Jul. 30, 2007.

Official communication issued in counterpart International Application No. PCT/EP2006010297, dated Jun. 12, 2007.

Reichel et al.: "Joint Scalable Video Model JSVM-7." Joint Video Team (JVT) of ISO/IEC MPEG & ITU-T VCEG; Jul. 2006; 1,148 pages.

Segall et al., "CE1 Inter-layer Prediction for Bit-Depth Scalable Coding", Joint Video Team (JVT) of ISO/IEC MPEG & ITU-T VCEG, 25th Meeting: Shenzhen, CN, Oct. 15, 2007, pp. 1-6.

Segall et al., "System for Bit-Depth Scalable Coding", Joint Video Team (JVT) of ISO/IEC MPEG & ITU-T VCEG, 23rd Meeting: San Jose, CA, Apr. 17, 2007, pp. 1-7.

Segall et al.: "Tone Mapping SEI Message," XP-002436792; Joint Video Team (JVT) of ISO/IEC MPEG & ITU-T VCEG; Date Saved: Mar. 30, 2006; pp. 1-12.

Wiegand et al., "Bit-Depth Scalability", U.S. Appl. No. 12/937,759, filed Dec. 16, 2010.

Wiegand et al.: "Joint Draft 7 of SVC Amendment," Joint Video Team (JVT) of ISO/IEC MPEG & ITU-T VCEG; Jul. 2006; 1,674 pages.

Winken et al., "Bit-Depth Scalable Video Coding", IEEE International Conference on Image Processing, 2007, pp. I-5-I-8.

Ying et al.: "4:2:0 Chroma Sample Format for Phase Difference Eliminating and Color Space Scalability," XP-002362574; Joint Video Team (JVT) of ISO/IEC MPEG & ITU-T VCEG; Date Saved: Apr. 12, 2005; pp. 1-13.

Ying et al.: "New Downsampling and Upsampling Processes for Chroma Samples in SVC Spatial Scalability," XP-002436793; Joint Video Team (JVT) of ISO/IEC MPEG & ITU-T VCEG; Date Saved: Apr. 12, 2005; pp. 1-7.

Office Action dated Dec. 6, 2016 in U.S. Appl. No. 14/324,425.

Office Action dated Jul. 21, 2017 in U.S. Appl. No. 14/686,946.

Search Report EP Application No. 18211119.5 dated Apr. 5, 2019.

* cited by examiner

Frame

Guide:
X - Location of luma sample
○ - Location of chroma sample

FIG 5

Frame

Guide:
X - Location of luma sample
○ - Location of chroma sample

FIG 6

Frame

Guide:
X - Location of luma sample
○ - Location of chroma sample

QUALITY SCALABLE CODING WITH MAPPING DIFFERENT RANGES OF BIT DEPTHS

CROSS REFERENCE TO RELATED APPLICATION

This application is a Continuation Application of U.S. Ser. No. 15/803,310, filed Nov. 3, 2017, which is a Continuation Application of U.S. Ser. No. 14/324,425, filed Jul. 7, 2014, now U.S. Pat. No. 9,843,800, which is a Continuation Application of U.S. Ser. No. 12/447,005, filed Apr. 24, 2009, now U.S. Pat. No. 8,774,269, which is the U.S. National Phase of International Application No. PCT/EP2006/010297, filed Oct. 25, 2006. Each of the foregoing patent applications and patents is hereby incorporated by reference in its entirety.

The present invention is concerned with picture and/or video coding, and in particular, quality-scalable coding using quality-scalable data streams.

BACKGROUND OF THE INVENTION

A current project of the Joint Video Team (JVT) of the ISO/IEC Moving Pictures Experts Group (MPEG) and the ITU-I Video Coding Experts Group (VCEG) is the development of a scalable extension of the state-of-the-art video coding standard H.264/MPEG4-AVC defined in T. Wiegand, G. J. Sullivan, J. Reichel, H. Schwarz and M. Wien, eds., "Scalable Video Coding Joint Draft 7," Joint Video Team, Doc. JVT-T201, Klagenfurt, Germany, July 2006 and J. Reichel, H. Schwarz, and M. Wien, eds., "Joint Scalable Video Model JSVM-7," Joint Video Team, Doc. JVT-T202, Klagenfurt, Germany, July 2006, supports temporal, spatial and SNR scalable coding of video sequences or any combination thereof.

H.264/MPEG4-AVC as described in ITU-I Rec. & ISO/IEC 14496-10 AVC, "Advanced Video Coding for Generic Audiovisual Services, " version 3, 2005, specifies a hybrid video codec in which macroblock prediction signals are either generated in the temporal domain by motion compensated prediction, or in the spatial domain by intra prediction, and both predictions are followed by residual coding. H.264/MPEG4-AVC coding without the scalability extension is referred to as single-layer H.264/MPEG4-AVC coding. Rate-distortion performance comparable to single-layer H.264/MPEG4-AVC means that the same visual reproduction quality is typically achieved at 10% bit-rate. Given the above, scalability is considered as a functionality for removal of parts of the bit-stream while achieving an R-D performance at any supported spatial, temporal or SNR resolution that is comparable to single-layer H.264/MPEG4-AVC coding at that particular resolution.

The basic design of the scalable video coding (SVC) can be classified as a layered video codec. In each layer, the basic concepts of motion-compensated prediction and intra prediction are employed as in H.264/MPEG4-AVC. However, additional inter-layer prediction mechanisms have been integrated in order to exploit the redundancy between several spatial or SNR layers. SNR scalability is basically achieved by residual quantization, while for spatial scalability, a combination of motion compensated prediction and oversampled pyramid decomposition is employed. The temporal scalability approach of H.264/MPEG4-AVC is maintained.

Figure 3:
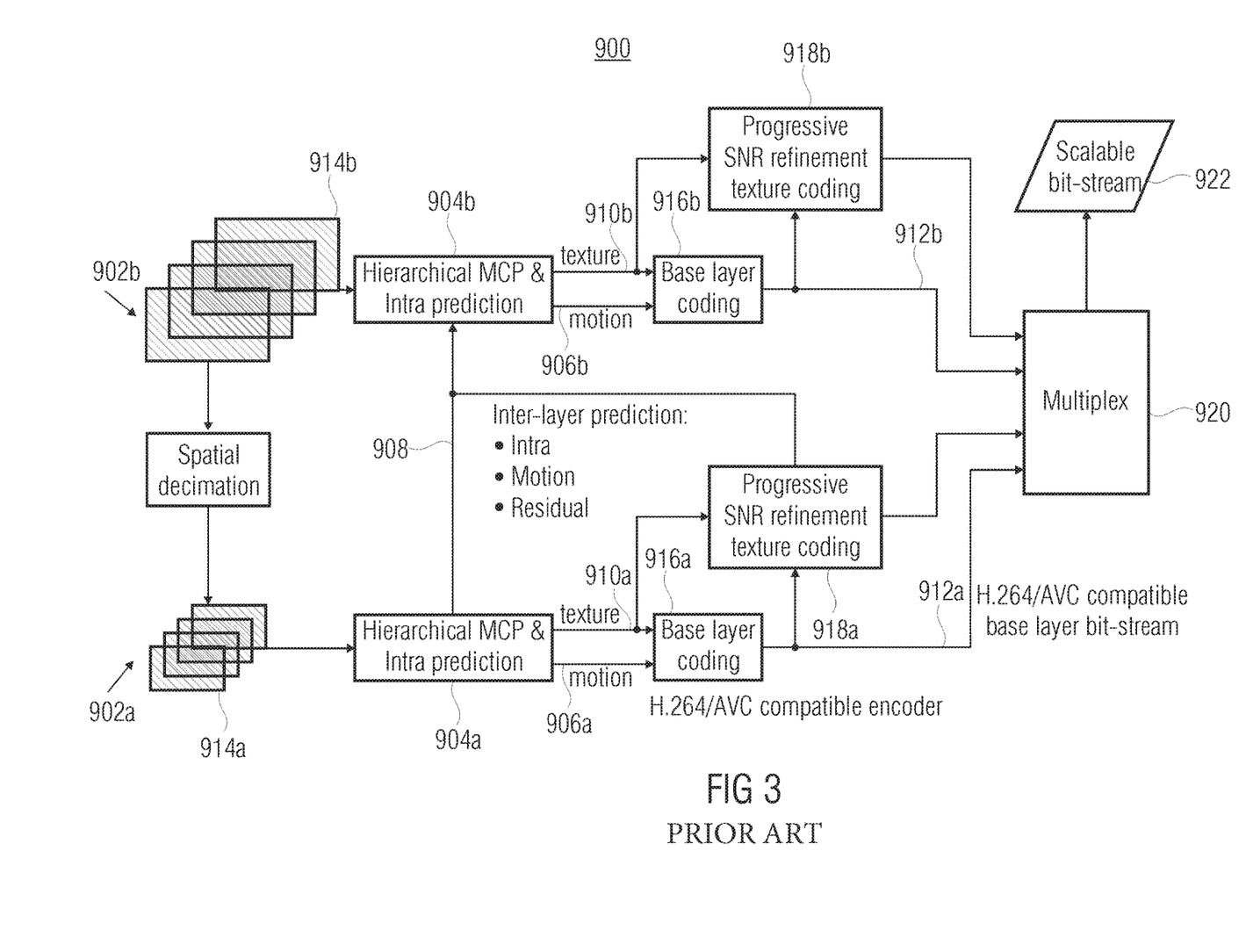
FIG. 3 is a block diagram of a conventional coder structure for scalable video coding.

In general, the coder structure depends on the scalability space that may be used in an application. For illustration, FIG. 3 shows a typical coder structure 900 with two spatial layers 902a, 902b. In each layer, an independent hierarchical motion-compensated prediction structure 904a,b with layer-specific motion parameters 906a,b is employed. The redundancy between consecutive layers 902a,b is exploited by inter-layer prediction concepts 908 that include prediction mechanisms for motion parameters 906a,b as well as texture data 910a,b. A base representation 912a,b of the input pictures 914a,b of each layer 902a,b is obtained by transform coding 916a,b similar to that of H.264/MPEG4-AVC, the corresponding NAL units (NAL—Network Abstraction Layer) contain motion information and texture data; the NAL units of the base representation of the lowest layer, i.e. 912a, are compatible with single-layer H.264/MPEG4-AVC. The reconstruction quality of the base representations can be improved by an additional coding 918a,b of so-called progressive refinement slices; the corresponding NAL units can be arbitrarily truncated in order to support fine granular quality scalability (FGS) or flexible bit-rate adaptation.

The resulting bit-streams output by the base layer coding 916a,b and the progressive SNR refinement texture coding 918a,b of the respective layers 902a,b, respectively, are multiplexed by a multiplexer 920 in order to result in the scalable bit-stream 922. This bit-stream 922 is scalable in time, space and SNR quality.

Summarizing, in accordance with the above scalable extension of the Video Coding Standard H.264/MPEG4-AVC, the temporal scalability is provided by using a hierarchical prediction structure. For this hierarchical prediction structure, the one of single-layer H.264/MPEG4-AVC standards may be used without any changes. For spatial and SNR scalability, additional tools have to be added to the single-layer H.264/MPEG4.AVC. All three scalability types can be combined in order to generate a bit-stream that supports a large degree on combined scalability.

For SNR scalability, coarse-grain scalability (CGS) and fine-granular scalability (FGS) are distinguished. With CGS, only selected SNR scalability layers are supported and the coding efficiency is optimized for coarse rate graduations as factor 1.5-2 from one layer to the next. FGS enables the truncation of NAL units at any arbitrary and eventually byte-aligned point. NAL units represent bit packets, which are serially aligned in order to represent the scalable bit-stream 922 output by multiplexer 920.

In order to support fine-granular SNR scalability, so called progressive refinement (PR) slices have been introduced. Progressive refinement slices contain refinement information for refining the reconstruction quality available for that slice from the base layer bit-stream 912a,b, respectively. Even more precise, each NAL unit for a PR slice represents a refinement signal that corresponds to a bisection of a quantization step size (QP decrease of 6). These signals are represented in a way that only a single inverse transform has to be performed for each transform block at the decoder side. In other words, the refinement signal represented by a PR NAL unit refines the transformation coefficients of transform blocks into which a current picture of the video has been separated. At the decoder side, this refinement signal may be used to refine the transformation coefficients within the base layer bit-stream before performing the inverse transform in order to reconstruct the texture of prediction residual used for reconstructing the actual picture by use of a spatial and/or temporal prediction, such as by means of motion compensation.

The progressive refinement NAL units can be truncated at any arbitrary point, so that the quality of the SNR base layer can be improved in a fine granular way. Therefore, the coding order of transform coefficient levels has been modified. Instead of scanning the transform coefficients macroblock-by-macroblock, as it is done in (normal) slices, the transform coefficient blocks are scanned in separate paths and in each path, only a few coding symbols for a transform coefficient block are coded. With the exception of the modified coding order, the CABAC entropy coding as specified in H.264/MPEG4-AVC is reused.

The single-layer H.264/MPEG4-AVC coding standard has been developed for the use of a fixed sampling structure among possible chroma sampling structures, such as, for example, 4:2:0 and 4:2:2, respectively. The different chroma sampling capabilities are included in different profiles of the standard. In this regard, reference is made to Marpe, Wiegand, Sullivan: "The H.264/MPEG4 Advanced Video Coding Standard and its applications", IEEE Communication Magazine, August 2006, p. 134-143. In 4:2:0, for example, the chroma or coloring sampling content indicating the extent to which the color deviates from gray and being defined by two chroma components amounts to, regarding the sampling points, merely one fourth of the number of samples of the luma content representing brightness and being defined by one luma component. In other words, the number of luma component samples in both the horizontal and vertical dimensions is half the number of luma samples. The coding precision used per sample is fixed to be 8 bits or 10 bits, depending on the profile of the standard used. Again, reference is made to the just mentioned article. For sake of completeness, it is noted that the term luma, according to the standard, actually means a weighted sum of non-linear or gamma-corrected RGB contributions. However, according to another view, luma may be viewed as luminance which refers to the linear relationship of the RGB contributions. According to the present application, both views shall equally apply.

Figure 4:
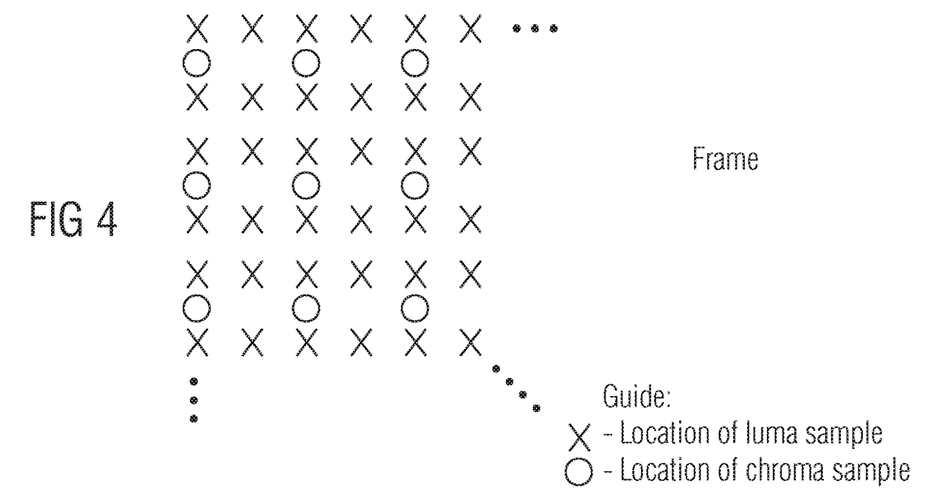
FIG. 4 is a schematic illustrating a 4:2:0 chroma sampling format.
Figure 5:
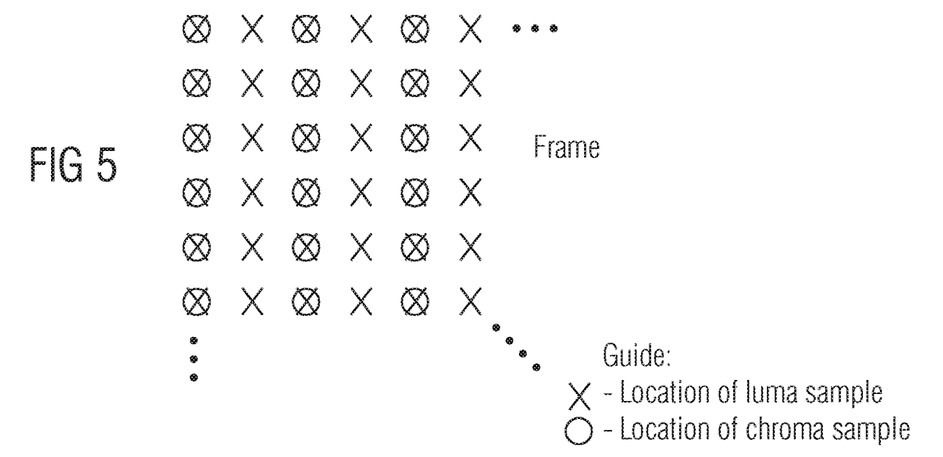
FIG. 5 is a schematic illustrating a 4:2:2 chroma sampling format.
Figure 6:
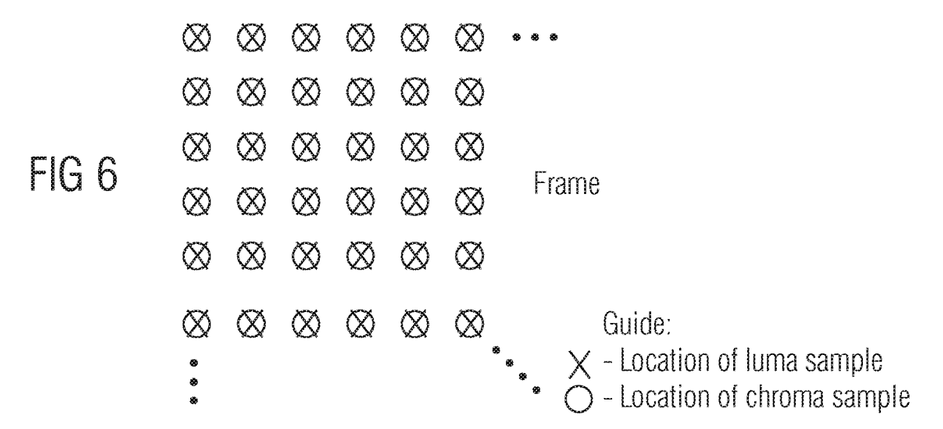
FIG. 6 is a schematic illustrating a 4:4:4 chroma sampling format.

In general, the term chroma sampling format refers to the number and position of the chroma samples relative to the number and position of the corresponding luma samples. Three examples of possible sampling formats are described now. As has already been described, according to the 4:2:0 sampling, the chroma signal has half the horizontal and half the vertical resolution as compared to the luma signal. The format is illustrated in FIG. 4, where the crosses indicate the locations of the luma samples, whereas the circles represent the locations of the chroma samples, where each chroma sample may consist of two chroma components, such as Cb and Cr. Another sampling format is 4:2:2, where the chroma signal has half the horizontal and the same vertical resolution as the luma signal. This is shown in FIG. 5. According to a 4:4:4 chroma sampling format, the chroma signal has the same horizontal and vertical resolution as the luma signal or content, respectively. This is illustrated in FIG. 6.

Problems arise when a color video source signal has a different dynamic range and/or a different chroma sampling format than may be used by the decoder or player, respectively. In the above current SVC working draft, the scalability tools are only specified for the case that both the base layer and enhancement layer represent a given video source with the same bit depth of the corresponding arrays of luma and chroma samples, and in addition with the assumption that the chroma sampling relative to the luma sampling, i.e., the chroma sampling format, is fixed for base and enhancement layer(s). Hence, considering different decoders and players, respectively, requiring different bit depths and chroma sampling formats, several coding streams dedicated for each of the bit depths and chroma sampling format requirements would have to be provided separately. However, in rate/distortion sense, this means an increased overhead and reduced efficiency, respectively.

Thus, it would be desirable to provide a coding scheme that overcomes this deficiency.

SUMMARY

According to an embodiment, an encoder for encoding a picture into a quality-scalable data stream may have: a base encoder for encoding the picture into a base encoding data stream representing a representation of the picture with a first picture sample bit depth; a predictor for providing a prediction of the picture based on the representation of the picture with the first picture sample bit depth, the prediction of the picture including a second picture sample bit depth being higher than the first picture sample bit depth; and a residual encoder for encoding a prediction residual of the prediction into a bit-depth enhancement layer data stream; and a combiner for forming the quality-scalable data stream based on the base encoding data stream and the bit-depth enhancement layer data stream.

According to another embodiment, a decoder for decoding a quality-scalable data stream into which a picture is encoded, the quality-scalable data stream including a base layer data stream representing the picture with a first picture sample bit depth and a bit-depth enhancement layer data stream representing a prediction residual with a second picture sample bit depth being higher than the first picture sample bit depth, may have: a first sub-decoder for decoding the base layer data stream into a lower bit-depth reconstructed picture; a second sub-decoder for decoding the bit-depth enhancement data stream into the prediction residual; a provider for providing a prediction of the picture based on the lower bit-depth reconstructed picture, the prediction of the picture including the second picture sample bit depth; and a reconstruct or for reconstructing the picture with the second picture sample bit depth based on the prediction and the prediction residual.

According to another embodiment, a method for encoding a picture into a quality-scalable data stream may have the steps of: encoding the picture into a base encoding data stream representing a representation of the picture with a first picture sample bit depth; providing a prediction of the picture based on the representation of the picture with the first picture sample bit depth, the prediction of the picture including a second picture sample bit depth being higher than the first picture sample bit depth; and encoding a prediction residual of the prediction into a bit-depth enhancement layer data stream; and forming the quality-scalable data stream based on the base encoding data stream and the bit-depth enhancement layer data stream.

According to another embodiment, a method for decoding a quality-scalable data stream into which a picture is encoded, the quality-scalable data stream including a base layer data stream representing the picture with a first picture sample bit depth and a bit-depth enhancement layer data stream representing a prediction residual with a second picture sample bit depth being higher than the first picture sample bit depth, may have the steps of: decoding the base layer data stream into a lower bit-depth reconstructed picture; decoding the bit-depth enhancement data stream into the prediction residual; providing a prediction of the picture based on the lower bit-depth reconstructed picture, the prediction of the picture including the second picture sample bit depth; and reconstructing the picture with the second picture sample bit depth based on the prediction and the prediction residual.

According to another embodiment, a computer program may have a program code for performing, when running on a computer, a method for encoding a picture into a quality-scalable data stream, wherein the method may have the steps of: encoding the picture into a base encoding data stream representing a representation of the picture with a first picture sample bit depth; providing a prediction of the picture based on the representation of the picture with the first picture sample bit depth, the prediction of the picture including a second picture sample bit depth being higher than the first picture sample bit depth; and encoding a prediction residual of the prediction into a bit-depth enhancement layer data stream; and forming the quality-scalable data stream based on the base encoding data stream and the bit-depth enhancement layer data stream.

According to another embodiment, a computer program may have a program code for performing, when running on a computer, a method for decoding a quality-scalable data stream into which a picture is encoded, the quality-scalable data stream including a base layer data stream representing the picture with a first picture sample bit depth and a bit-depth enhancement layer data stream representing a prediction residual with a second picture sample bit depth being higher than the first picture sample bit depth, wherein the method may have the steps of: decoding the base layer data stream into a lower bit-depth reconstructed picture; decoding the bit-depth enhancement data stream into the prediction residual; providing a prediction of the picture based on the lower bit-depth reconstructed picture, the prediction of the picture including the second picture sample bit depth; and reconstructing the picture with the second picture sample bit depth based on the prediction and the prediction residual.

The present invention is based on the finding that a more efficient way of addressing different bit-depths or different bit-depths and chroma sampling format requirements may be achieved when using a low bit-depth or low bit-depth and low-chroma resolution representation—in the following shortly called low bit-depth and/or low-chroma resolution representation—for providing a respective base layer data stream representing this low bit-depth and/or low-chroma resolution representation as well as for providing a higher bit-depth and/or higher chroma resolution representation so that a respective prediction residual may be encoded in order to obtain a higher bit-depth and/or higher chroma resolution representation. By this measure, an encoder is enabled to store a base-quality representation of a picture or a video sequence, which can be decoded by any legacy decoder or video decoder, together with an enhancement signal for higher bit-depth and/or reduced chroma sub-sampling, which may be ignored by legacy decoders or video decoders. For example, the base quality representation could contain an 8-bit version of the picture or the video sequence, while the high quality enhancement signal contains a "refinement" to a 10-bit version of the same, and the base quality representation could represent a 4:2:0 version of the picture or the video sequence, while the high quality enhancement signal contains a "refinement" to a 4:2:2 or 4:4:4 version of the same.

BRIEF DESCRIPTION OF THE DRAWINGS

Embodiments of the present invention will be detailed subsequently referring to the appended drawings, in which.

DETAILED DESCRIPTION OF THE INVENTION

Figure 1:
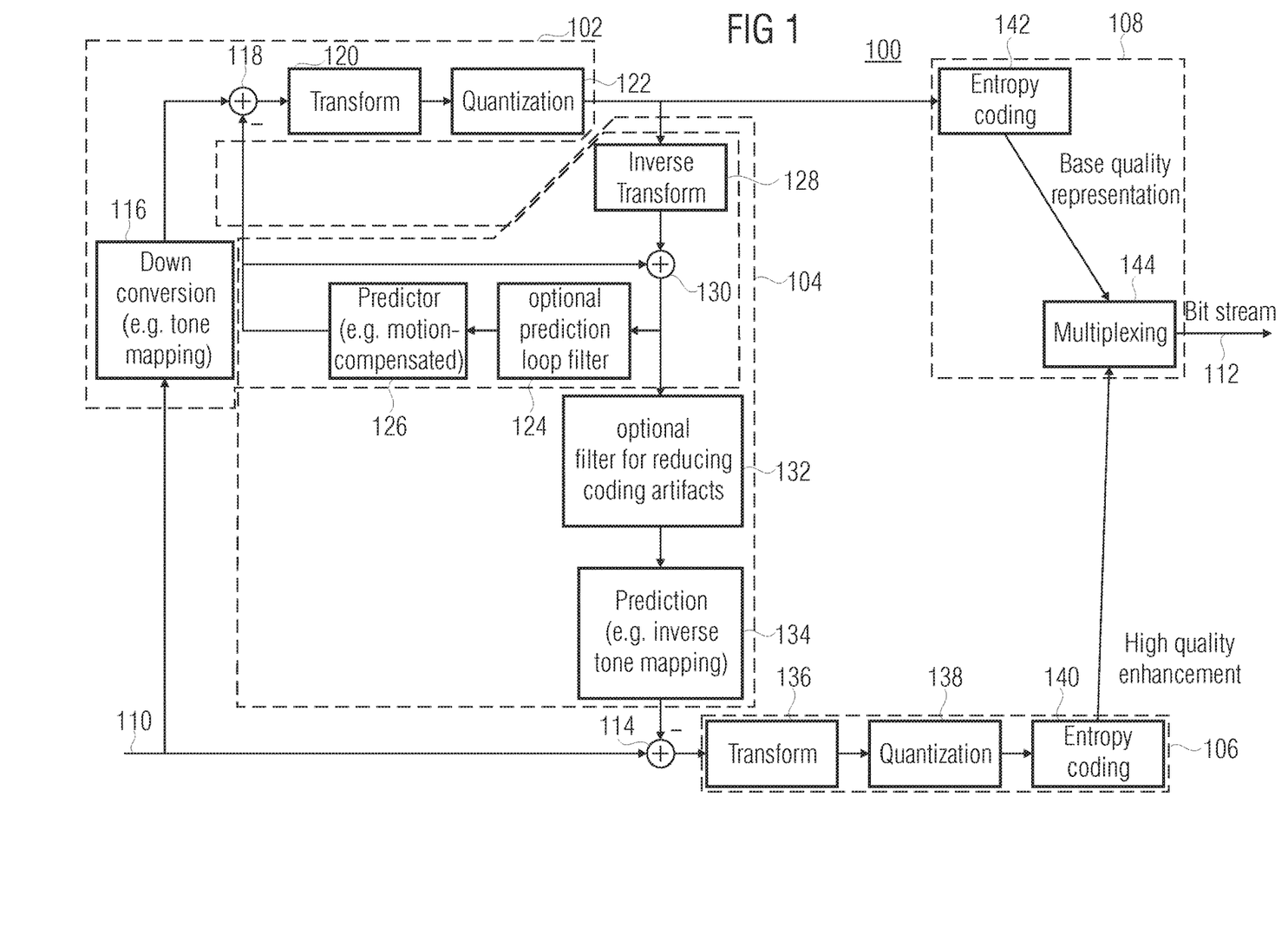
FIG. 1 is a block diagram of a video encoder according to an embodiment of the present invention.

FIG. 1 shows an encoder 100 comprising a base encoding means 102, a prediction means 104, a residual encoding means 106 and a combining means 108 as well as an input 110 and an output 112. The encoder 100 of FIG. 1 is a video encoder receiving a high quality video signal at input 110 and outputting a quality-scalable bit stream at output 112. The base encoding means 102 encodes the data at input 110 into a base encoding data stream representing the content of this video signal at input 110 with a reduced picture sample bit-depth or a chroma-sampling format having same luma resolution, but reduced chroma resolution compared to the input signal at input 110. The prediction means 104 is adapted to, based on the base encoding data stream output by base encoding means 102, provide a prediction signal with full or increased picture sample bit-depth and/or full or increased chroma resolution for the video signal at input 110. A subtractor 114 also comprised by the encoder 100 forms a prediction residual of the prediction signal provided by means 104 relative to the high quality input signal at input 110, the residual signal being encoded by the residual encoding means 106 into a quality enhancement layer data stream. The combining means 108 combines the base encoding data stream from the base encoding means 102 and the quality enhancement layer data stream output by residual encoding means 106 to form a quality scalable data stream 112 at the output 112. The quality-scalability means that the data stream at the output 112 is composed of a part that is self-contained in that it enables reconstruction of the video signal 110 with the reduced bit-depth and/or the chroma sampling format having the reduced chroma resolution without any further information and with neglecting the remainder of the data stream 112, on the one hand and a further part which enables, in combination with the first part, a reconstruction of the video signal at input 110 in the original bit-depth and original chroma sampling format being higher than the bit depth and/or chroma resolution of the first part.

After having rather generally described the structure and the functionality of encoder 100, its internal structure is described in more detail below. In particular, the base encoding means 102 comprises a down conversion module 116, a subtractor 118, a transform module 120 and a quantization module 122 serially connected, in the order mentioned, between the input 110, and the combining means 108 and the prediction means 104, respectively. The down conversion module 116 is for reducing the bit-depth of the picture samples of and/or the chroma resolution of the pictures of the video signal at input 110, with maintaining the luma resolution of the video signal received from the input 110. In other words, the down conversion module 116 irreversibly down-converts the high quality input video signal at input 110 to a base quality video signal. As will be described in more detail below, this down-conversion may include reducing the bit-depth of the signal samples, i.e. pixel values, in the video signal at input 110 using any tone-mapping scheme, such as rounding of the sample values, sub-sampling of the chroma components in case the video signal is given in the form of luma plus chroma components, filtering of the input signal at input 110, such as by a RGB to YCbCr conversion, or any combination thereof. More details on possible prediction mechanisms are presented in the following. In particular, it is possible that the down-conversion module 116 uses different down-conversion schemes for each picture of the video signal or picture sequence input at input 110 or uses the same scheme for all pictures.

The subtractor 118, the transform module 120 and the quantization module 122 co-operate to encode the base quality signal output by down-conversion module 116 by the use of, for example, a non-scalable video coding scheme, such as H.264/MPEG4-AVC. According to the example of FIG. 1, the subtractor 118, the transform module 120 and the quantization module 122 co-operate with an optional prediction loop filter 124, a predictor module 126, an inverse transform module 128, and an adder 130 commonly comprised by the base encoding means 102 and the prediction means 104 to form the irrelevance reduction part of a hybrid encoder which encodes the base quality video signal output by down-conversion module 116 by motion-compensation based prediction and following compression of the prediction residual. In particular, the subtractor 118 subtracts from a current picture or macroblock of the base quality video signal a predicted picture or predicted macroblock portion reconstructed from previously encoded pictures of the base quality video signal by, for example, use of motion compensation. The transform module 120 applies a transform on the prediction residual, such as a DCT, FFT or wavelet transform. The transformed residual signal may represent a spectral representation and its transform coefficients are irreversibly quantized in the quantization module 122. The resulting quantized residual signal represents the residual of the base-encoding data stream output by the base-encoding means 102.

Apart from the optional prediction loop filter 124 and the predictor module 126, the inverse transform module 128, and the adder 130, the prediction means 104 comprises an optional filter for reducing coding artifacts 132 and a prediction module 134. The inverse transform module 128, the adder 130, the optional prediction loop filter 124 and the predictor module 126 co-operate to reconstruct the video signal with a reduced bit-depth and/or the chroma sampling format having reduced chroma resolution, as defined by the down-conversion module 116. In other words, they create a low bit-depth and/or low chroma resolution video signal to the optional filter 132 which represents a low quality representation of the source signal at input 110 also being reconstructable at decoder side. In particular, the inverse transform module 128 and the adder 130 are serially connected between the quantization module 122 and the optional filter 132, whereas the optional prediction loop filter 124 and the prediction module 126 are serially connected, in the order mentioned, between an output of the adder 130 as well as a further input of the adder 130. The output of the predictor module 126 is also connected to an inverting input of the subtractor 118. The optional filter 132 is connected between the output of adder 130 and the prediction module 134, which, in turn, is connected between the output of optional filter 132 and the inverting input of subtractor 114.

The inverse transform module 128 inversely transforms the base-encoded residual pictures output by base-encoding means 102 to achieve low bit-depth and/or low chroma resolution residual pictures. Accordingly, inverse transform module 128 performs an inverse transform being an inversion of the transformation and quantization performed by modules 120 and 122. Alternatively, a dequantization module may be separately provided at the input side of the inverse transform module 128. The adder 130 adds a prediction to the reconstructed residual pictures, with the prediction being based on previously reconstructed pictures of the video signal. In particular, the adder 130 outputs a reconstructed video signal with a reduced bit-depth and/or reduced chroma resolution chroma-sampling format. These reconstructed pictures are filtered by the loop filer 124 for reducing artifacts, for example, and used thereafter by the predictor module 126 to predict the picture currently to be reconstructed by means of, for example, motion compensation, from previously reconstructed pictures. The base quality signal thus obtained at the output of adder 130 is used by the serial connection of the optional filter 132 and prediction module 134 to get a prediction of the high quality input signal at input 110, the latter prediction to be used for forming the high quality enhancement signal at the output of the residual encoding means 106. This is described in more detail below.

In particular, the low quality signal obtained from adder 130 is optionally filtered by optional filter 132 for reducing coding artifacts. Thereafter, the low quality video signal is used by prediction module 134 to form a prediction signal for the high quality video signal received at the non-inverting input of adder 114 being connected to the input 110. This process of forming the high quality prediction may include multiplying the decoded base quality signal picture samples by a constant factor, i.e. linear scaling, using the respective value of the base quality signal samples for indexing a look-up table which contains the corresponding high quality sample values, using the value of the base quality signal sample for an interpolation process to obtain the corresponding high quality sample value, up-sampling of the chroma components, filtering of the base quality signal by use of, for example, YCbCr to RGB conversion, or any combination thereof. Other examples are described in the following.

In general, for example, the prediction module 134 may map the samples of the base quality video signal from a first dynamic range to a second dynamic range being higher than the first dynamic range and/or, by use of a special interpolation filter, interpolate the chroma samples of the base quality video signal to increase the chroma resolution to correspond with the chroma resolution of the video signal at the input 110. In a way similar to the above description of the down-conversion module 116, it is possible to use a different prediction process for different pictures of the base quality video signal sequence as well as using the same prediction process for all the pictures.

The subtractor 114 subtracts the high quality prediction received from the prediction module 134 from the high quality video signal received from input 110 to output a prediction residual signal of high quality, i.e. with the original bit-depth and/or chroma sampling format to the residual encoding means 106. At the residual encoding means 106, the difference between the original high quality input signal and the prediction derived from the decoded base quality signal is encoded exemplarily using a compression coding scheme such as, for example, specified in H.264/MPEG4-AVC. To this end, the residual encoding means 106 of FIG. 1 comprises exemplarily a transform module 136, a quantization module 138 and an entropy coding module 140 connected in series between an output of the subtractor 114 and the combining means 108 in the mentioned order. The transform module 136 transforms the residual signal or the pictures thereof, respectively, into a transformation domain or spectral domain, respectively, where the spectral components are quantized by the quantization module 138 and with the quantized transform values being entropy coded by the entropy-coding module 140. The result of the entropy coding represents the high quality enhancement layer data stream output by the residual encoding means 106. If modules 136 to 140 implement an H.264/MPEG4-AVC coding, which supports transforms with a size of 4×4 or 8×8 samples for coding the luma content, the transform size for transforming the luma component of the residual signal from the subtractor 114 in the transform module 136 may arbitrarily be chosen for each macroblock and does not necessarily have to be the same as used for coding the base quality signal in the transform module 120. For coding the chroma components, the H.264/MPEG4-AVC standard, as currently specified, provides no choice. When quantizing the transform coefficients in the quantization module 138, the same quantization scheme as in the H.264/MPEG4-AVC may be used, which means that the quantizer step-size may be controlled by a quantization parameter QP, which can take values from −6*(bit depth of high quality video signal component −8) to 51. The QP used for coding the base quality representation macroblock in the quantization module 122 and the QP used for coding the high quality enhancement macroblock in the quantization module 138 do not have to be the same.

Combining means 108 comprises an entropy coding module 142 and the multiplexer 144. The entropy-coding module 142 is connected between an output of the quantization module 122 and a first input of the multiplexer 144, whereas a second input of the multiplexer 144 is connected to an output of entropy coding module 140. The output of the multiplexer 144 represents output 112 of encoder 100.

The entropy encoding module 142 entropy encodes the quantized transform values output by quantization module 122 to form a base quality layer data stream from the base encoding data stream output by quantization module 122. Therefore, as mentioned above, modules 118, 120, 122, 124, 126, 128, 130 and 142 may be designed to co-operate in accordance with the H.264/MPEG4-AVC, and represent together a hybrid coder with the entropy coder 142 performing a lossless compression of the quantized prediction residual.

The multiplexer 144 receives both the base quality layer data stream and the high quality layer data stream and puts them together to form the quality-scalable data stream.

The way, in which the prediction module 134 forms the prediction signal from the decoded base representation, i.e. the prediction scheme, may be known to the decoder. However, it is also possible to signal prediction scheme information indicating the prediction used by the prediction module 134 as side information, i.e. to introduce such side information into the bit stream at output 112. In other words, in order to allow using different schemes for prediction from the decoded base representation, the used prediction scheme may be signaled as side information, e.g., in an extension of the picture parameter set PPS of H.264/MPEG4-AVC. Further, there may be provisions in case there is no explicit prediction rule specified in the quality scalable bit stream. For example, for scalability in terms of bit-depth, the base quality samples at the input of the prediction module 134 are simply multiplied by $2^{M-N}$, where M is the bit-depth of the high quality signal and N is the bit-depth of the base quality signal, which corresponds to a linear mapping. Alternatively, this may be viewed as a performance of a scaling and clipping of the base quality sample values at the input of the prediction module 134 according to min $(2^{M-N}x, 2^{M-1})$.

Alternatively, one of the following mapping mechanisms may be used for the prediction process. For example, piece-wise linear mapping may be used where an arbitrary number of interpolation points can be specified. For example, for a base quality sample with value x and two given interpolation points $(X_n, Y_n)$ and $(X_{n+1}, Y_{n+1})$ the corresponding prediction sample y is obtained by the module 134 according to the following formula $$Y = Y_n + \frac{X - X_n}{X_{n+1} - X_n}(Y_{n+1} - Y_n)$$

This linear interpolation can be performed with little computational complexity by using only bit shift instead of division operations if $X_{n+1}-X_n$ is restricted to be a power of two.

A further possible mapping mechanism represents a look-up table mapping in which, by means of the base quality sample values, a table look-up is performed in a look-up table in which for each possible base quality sample value the corresponding prediction sample value is specified. The look-up table may be provided to the decoder side as side information or may be known to the decoder side by default.

Further, scaling with a constant offset may be used. According to this alternative, in order to achieve the corresponding high quality prediction sample y having higher bit-depth, module 134 multiplies the base quality samples x by a constant factor $2^{M-N-K}$, and afterwards a constant offset $2^{M-1}-2^{M-1-K}$ is added, according to, for example, one of the following formulae:

$$y=2^{M-N-K}x+2^{M-1}-2^{M-1-K} \text{ or}$$

$$y=\min(2^{M-N-K}x+2^{M-1}-2^{M-1-K}, 2^{M-1}), \text{ respectively.}$$

By this measure, the low quality dynamic range $[0;2^N-1]$ is mapped to the second dynamic range $[0;2^M-1]$ in a manner according to which the mapped values of x are distributed in a centralised manner with respect to the possible dynamic range $[0;2^M-1]$ of y within an extension which is determined by K. The value of K could be an integer value or real value, and could be transmitted as side information to the decoder within, for example, the quality-scalable data stream so that at the decoder some predicting means may act the same way as the prediction module 134 as will be described in the following. With respect to the definition of M and N reference is made to the above description. A round operation may be used to get integer valued y values.

Another possibility is scaling with variable offset: the base quality samples x are multiplied by a constant factor, and afterwards a variable offset is added, according to, for example, one of the following formulae:

$$y=2^{M-N-K}x+D \text{ or}$$

$$y=\min(2^{M-N-K}x+D, 2^M-1)$$

By this measure, the low quality dynamic range is mapped to the second dynamic range in a manner according to which the mapped values of x are distributed within a portion of the possible dynamic range of y, the extension of which is determined by K, and the offset of which with respect to the lower boundary is determined by D. D may be integer or real. The result y represents a picture sample value of the high bit-depth prediction signal. The values of K and D could be transmitted as side information to the decoder within, for example, the quality-scalable data stream. Again, a round operation may be used to get integer valued y values, the latter being true also for the other examples given in the present application for the bit-depth mappings without explicitly stating it repeatedly.

An even further possibility is scaling with superposition: the high bit depth prediction samples y are obtained from the respective base quality sample x according to, for example, one of the following formulae, where floor (a) rounds a down to the nearest integer:

$$y=\text{floor}(2^{M-N}x+2^{M-2N}x) \text{ or}$$

$$y=\min(\text{floor}(2^{M-N}x+2^{M-2N}x), 2^M-1)$$

The just mentioned possibilities may be combined. For example, scaling with superposition and constant offset may be used: the high bit depth prediction samples y are obtained according to, for example, one of the following formulae, where floor (a) rounds a down to the nearest integer:

$$y=\text{floor}(2^{M-N-K}x+2^{M-2N-K}x+2^{M-1}-2^{M-1-K})$$

$$y=\min(\text{floor}(2^{M-N-K}x+2^{M-2N-K}x+2^{M-1}-2^{M-1-K}), 2^M-1)$$

The value of K may be specified as side information to the decoder.

Similarly, scaling with superposition and variable offset may be used: the high bit depth prediction samples y are obtained according to the following formula, where floor (a) rounds a down to the nearest integer:

$$y=\text{floor}(2^{M-N-K}x+2^{M-2N-K}x+D)$$

$$y=\min(\text{floor}(2^{M-N-K}x+2^{M-2N-K}x+D), 2^{M-1})$$

The values of D and K may be specified as side information to the decoder.

Further, it is possible to specify different mapping mechanisms for the luma and the chroma components of the base quality signal to take into account that the statistics, such as their probability density function, may be different. It is also possible to specify different mapping mechanisms for different regions of a picture, where a region not necessarily has to be contiguous. Furthermore, it is possible to specify that, after employing one of the above described mapping mechanisms, a pseudo-random noise signal ("dithering signal") is to be added to the high bit depth prediction signal within the prediction process preformed by prediction module at the encoder and at the decoder, respectively. Since this signal has to be exactly known at the decoder to be able to decode the high bit depth representation, certain parameters as initialization value of the pseudo-random generator, variance and shape (e.g., normal or uniform distribution) of the pseudo-random process may have to be transmitted as side information. In case no such side information is transmitted in the scalable bit stream, default values, as for example a uniform distribution of pseudo-random values in the range $[0, 2^{M-N}-1]$ or $[0, 2^{M-N-K}-1]$ respectively, depending on the selected mapping mechanism, could be used.

The abovementioned possibilities of using prediction scheme side information or not also applies for the scalability in terms of chroma sampling format. For scalability in terms of chroma sampling format, the scheme of interpolation filtering used by the prediction module 134 for generating the upsampled chroma signal can be transmitted as side information, e.g., in the PPS of H.264/MPEG4-AVC. In the simplest case, if there is no upsampling rule specified, the decoder may assume that the upsampled signal is generated by linear interpolation between base quality chroma sample points for conversion from 4:2:0 to 4:2:2 and from 4:2:2 to 4:4:4 chroma subsampling and by bilinear interpolation for conversion from 4:2:0 to 4:4:4 chroma subsampling. With regard to the just-mentioned chroma-sampling format, reference is made to the above description with respect to FIGS. 4 to 6. Otherwise, it is possible that the prediction module 134 selects either, for example, an 8-tap half-pel interpolation filter specified by MPEG4 Advanced Simple Profile in ISO/IEC 14496-2:2004, "Information technology Coding of audio-visual objects—Part 2: Visual", or the 6-tap half-pel interpolation filter specified by H.264/MPEG4-AVC for generating interpolated chroma sample values. However, the prediction scheme with respect to chroma sampling format scalability is not restricted to the aforementioned filters. It is also possible to specify a generic interpolation filter by transmitting the used filter taps or FIR filter coefficients, respectively, as side information in the in the quality-scalable bit stream, e.g., in the PPS of the H.264/MPEG4-AVC.

Regarding the scalability in terms of chroma sampling format, it shall be expressively noted that the encoder 100 may support the following variants when considering the chroma sampling formats shown in FIGS. 4 to 6. Firstly, the down-conversion module 116 may down sample from 4:2:2 to 4:2:0, in which case the prediction module 134 upsamples from 4:2:0 to 4:2:2 and the quality-scalable bit stream at the output 112 enables chroma sampling format scalability from 4:2:0 to 4:2:2. Similarly, down-conversion module 116 may downsample from 4:4:4 to 4:2:0 with the prediction module 134 performing the upsampling in the reverse direction. Accordingly, the down-conversion module 116 may downsample from 4:4:4 to 4:2:2 and the prediction module 134 may, in turn, perform an upsampling from 4:2:2 to 4:4:4.

Within the coded high quality enhancement signal output by entropy coding module 140, the following information could be transmitted for each macroblock in case modules 136, 138 and 140 implement an H.264/MPEG4-AVC conforming encoding. A coded block pattern (CBP) information could be included indicating as to which of the four 8×8 luma transformation blocks within the macroblock and which of the associated chroma transformation blocks of the macroblock may contain non-zero transform coefficients. If there are no non-zero transform coefficients, no further information is transmitted for the particular macroblock. Further information could relate to the transform size used for coding the luma component, i.e. the size of the transformation blocks in which the macroblock consisting of 16×16 luma samples is transformed in the transform module 136, i.e. in 4×4 or 8×8 transform blocks. Further, the high quality enhancement layer data stream could include the quantization parameter QP used in the quantization module 138 for controlling the quantizer step-size. Further, the quantized transform coefficients, i.e. the transform coefficient levels, could be included for each macroblock in the high quality enhancement layer data stream output by entropy coding module 140.

Figure 2:
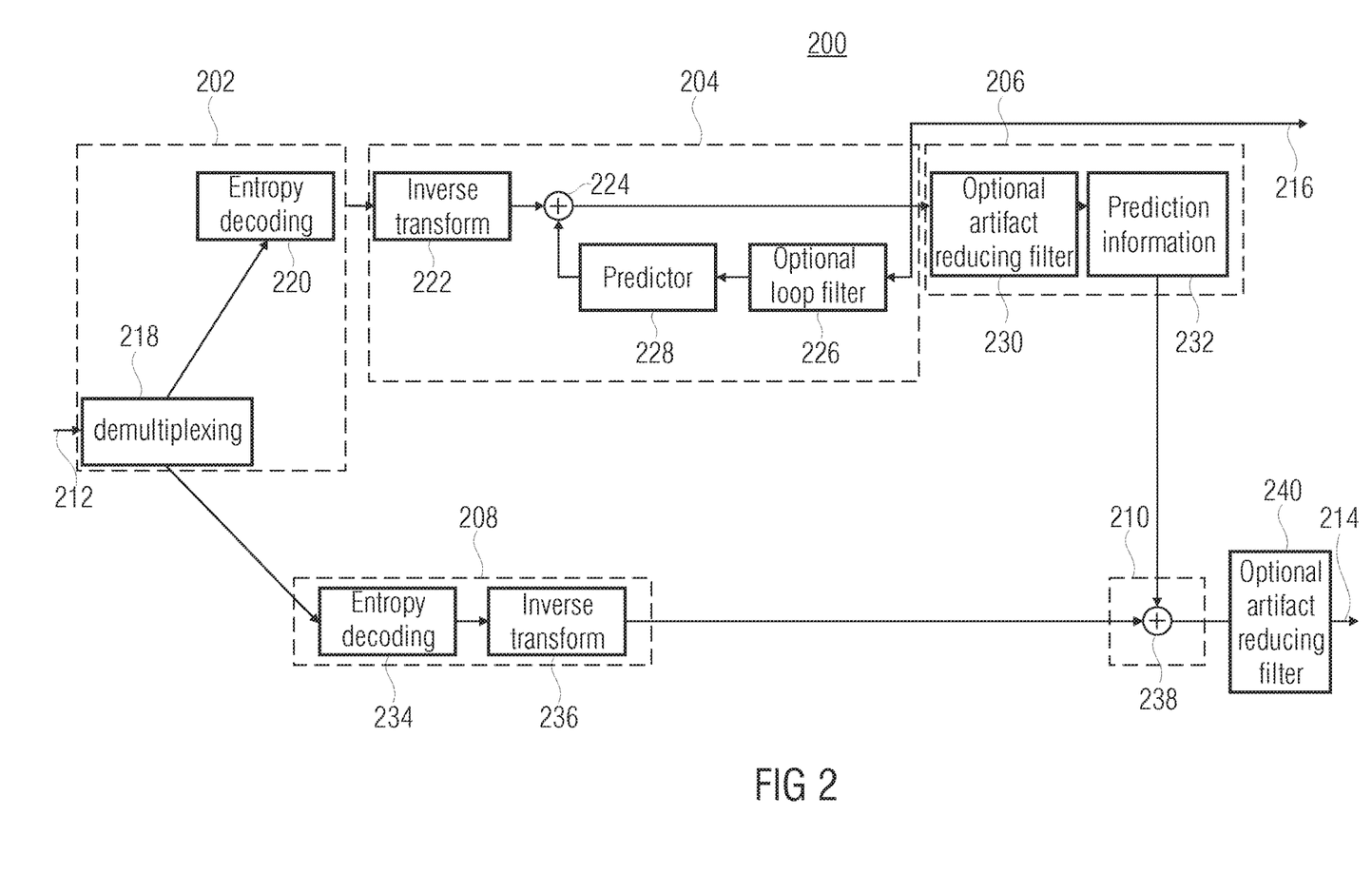
FIG. 2 is a block diagram of a video decoder according to an embodiment of the present invention.

After having described an embodiment for an encoder, with respect to FIG. 2, an embodiment of a decoder is described. The decoder of FIG. 2 is indicated by reference sign 200 and comprises a demultiplexing means 202, a base decoding means 204, a prediction means 206, a residual decoding means 208 and a reconstruction means 210 as well as an input 212, a first output 214 and a second output 216. The decoder 200 receives, at its input 212, the quality-scalable data stream, which has, for example, been output by encoder 100 of FIG. 1. As described above, the quality scalability may relate to the bit-depth and/or the chroma-sampling format. In other words, the data stream at the input 212 may have a self-contained part which is isolately usable to reconstruct the video signal with a reduced bit-depth and/or reduced chroma resolution and maintained luma resolution, as well as an additional part which, in combination with the first part, enables reconstructing the video signal with a higher bit-depth and/or higher chroma resolution. The lower quality reconstruction video signal is output at output 216, whereas the higher quality reconstruction video signal is output at output 214.

The demultiplexing means 202 divides up the incoming quality-scalable data stream at input 212 into the base encoding data stream and the high quality enhancement layer data stream, both of which have been mentioned with respect to FIG. 1. The base decoding means 204 is for decoding the base encoding data stream into the base quality representation of the video signal, which is directly, as it is the case in the example of FIG. 2, or indirectly via an artifact reduction filter (not shown), optionally outputable at output 216. Based on the base quality representation video signal, the prediction means 206 forms a prediction signal having the increased picture sample bit depth and/or the increased chroma sampling resolution. The decoding means 208 decodes the enhancement layer data stream to obtain the prediction residual having the increased bit-depth and/or increased chroma resolution. The reconstruction means 210 obtains the high quality video signal from the prediction and the prediction residual and outputs same at output 214 via an optional artifact reducing filter.

Internally, the demultiplexing means 202 comprises a demultiplexer 218 and an entropy decoding module 220. An input of the demultiplexer 218 is connected to input 212 and a first output of the demultiplexer 218 is connected to the residual decoding means 208. The entropy-decoding module 220 is connected between another output of the demultiplexer 218 and the base decoding means 204. The demultiplexer 218 divides the quality-scalable data stream into the base layer data stream and the enhancement layer data stream as having been separately input into the multiplexer 144, as described above. The entropy decoding module 220 performs, for example, a Huffman decoding or arithmetic decoding algorithm in order to obtain the transform coefficient levels, motion vectors, transform size information and other syntax elements that may be used in order to derive the base representation of the video signal therefrom. At the output of the entropy-decoding module 220, the base encoding data stream results.

The base decoding means 204 comprises an inverse transform module 222, an adder 224, an optional loop filter 226 and a predictor module 228. The modules 222 to 228 of the base decoding means 204 correspond, with respect to functionality and interconnection, to the elements 124 to 130 of FIG. 1. To be more precise, the inverse transform module 222 and the adder 224 are connected in series in the order mentioned between the demultiplexing means 202 on the one hand and the prediction means 206 and the base quality output, respectively, on the other hand, and the optional loop filter 226 and the predictor module 228 are connected in series in the order mentioned between the output of the adder 224 and another input of the adder 224. By this measure, the adder 224 outputs the base representation video signal with the reduced bit-depth and/or the reduced chroma resolution which is receivable from the outside at output 216.

The prediction means 206 comprises an optional artifact reduction filter 230 and a prediction information module 232, both modules functioning in a synchronous manner relative to the elements 132 and 134 of FIG. 1. In other words, the optional artifact reduction filter 230 optionally filters the base quality video signal in order to reduce artifacts therein and the prediction information module 232 retrieves predicted pictures with increased bit depths and/or increased chroma resolution in a manner already described above with respect to the prediction module 134. That is, the prediction information module 232 may, by means of side information contained in the quality-scalable data stream or not, map the incoming picture samples to a higher dynamic range and/or apply a spatial interpolation filter to the chroma content of the pictures in order to increase the chroma resolution.

The residual decoding means 208 comprises an entropy decoding module 234 and an inverse transform module 236, which are serially connected between the demultiplexer 218 and the reconstruction means 210 in the order just mentioned. The entropy decoding module 234 and the inverse transform module 236 cooperate to reverse the encoding performed by modules 136, 138, and 140 of FIG. 1. In particular, the entropy-decoding module 234 performs, for example, a Huffman decoding or arithmetic decoding algorithms to obtain syntax elements comprising, among others, transform coefficient levels, which are, by the inverse transform module 236, inversely transformed to obtain a prediction residual signal or a sequence of residual pictures.

The reconstruction means 210 comprises an adder 238 the inputs of which are connected to the output of the prediction information module 232, and the output of the inverse transform module 236, respectively. The adder 238 adds the prediction residual and the prediction signal in order to obtain the high quality video signal having the increased bit depth and/or increased chroma resolution which is fed via an optional artifact reducing filter 240 to output 214.

Thus, as is derivable from FIG. 2, a base quality decoder may reconstruct a base quality video signal from the quality-scalable data stream at the input 212 and may, in order to do so, not include elements 230, 232, 238, 234, 236, and 240. On the other hand, a high quality decoder may not include the output 216.

In other words, in the decoding process, the decoding of the base quality representation is straightforward. For the decoding of the high quality signal, first the base quality signal has to be decoded, which is performed by modules 218 to 228. Thereafter, the prediction process described above with respect to module 232 and optional module 230 is employed using the decoded base representation. The quantized transform coefficients of the high quality enhancement signal are scaled and inversely transformed by the inverse transform module 236, for example, as specified in H.264/MPEG4-AVC in order to obtain the residual or difference signal samples, which are added to the prediction derived from the decoded base representation samples by the prediction module 232. As a final step in the decoding process of the high quality video signal to be output at output 214, optional a filter can be employed in order to remove or reduce visually disturbing coding artifacts. It is to be noted that the motion-compensated prediction loop involving modules 226 and 228 is fully self-contained using only the base quality representation. Therefore, the decoding complexity is moderate and there is no need for an interpolation filter, which operates on the high bit depth or high chroma resolution image data in the motion-compensated prediction process of predictor module 228.

Regarding the above embodiments, it should be mentioned that the artifact reduction filters 132 and 230 are optional and could be removed. The same applies for the loop filters 124 and 226, respectively, and filter 240. Further, the present invention is not restricted to video coding. Rather, the above description is also applicable to still image coding. Accordingly, the motion-compensated prediction loop involving elements 118, 128, 130, 126, and 124 and the elements 224, 228, and 226, respectively, may be removed also. Similarly, the entropy coding mentioned needs not necessarily to be performed.

Even more precise, in the above embodiments, the base layer encoding 118-130, 142 was based on motion-compensated prediction based on a reconstruction of already lossy coded pictures. In this case, the reconstruction of the base encoding process may also be viewed as a part of the high-quality prediction forming process as has been done in the above description. However, in case of a lossless encoding of the base representation, a reconstruction would not be necessary and the down converted signal could be directly forwarded to means 132, 134, respectively. In the case of no motion-compensation based prediction in a lossy base layer encoding, the reconstruction for reconstructing the base quality signal at the encoder side would be especially dedicated for the high-quality prediction formation in 104. In other words, the above association of the elements 116-134 and 142 to means 102, 104 and 108, respectively, could be performed in another way. In particular, the entropy coding module 142 could be viewed as a part of base encoding means 102, with the prediction means merely comprising modules 132 and 134 and the combining means 108 merely comprising the multiplexer 144. This view correlates with the module/means association used in FIG. 2 in that the prediction means 206 does not comprise the motion compensation based prediction. Additionally, however, demultiplexing means 202 could be viewed as not including entropy module 220 so that base decoding means also comprises entropy decoding module 220. However, both views lead to the same result in that the prediction in 104 is performed based on a representation of the source material with the reduced bit-depth and/ or the reduced chroma resolution which is losslessly coded into and losslessly derivable from the quality-scalable bit stream and base layer data stream, respectively. According to the view underlying FIG. 1, the prediction 134 is based on a reconstruction of the base encoding data stream, whereas in case of the alternative view, the reconstruction would start from an intermediate encoded version or halfway encoded version of the base quality signal which misses the lossless encoding according to module 142 for being completely coded into the base layer data stream. In this regard, it should be further noted that the down-conversion in module 116 does not have to be performed by the encoder 100. Rather, encoder 100 may have two inputs, one receiving the high-quality signal and the other for receiving the down-converted version, from the outside.

In the above-described embodiments, the quality-scalability did merely relate to the bit depth and/or the chroma resolution. However, the above embodiments may easily be extended to include temporal scalability, spatial scalability, and fine granular quality scalability. For example, at the encoder side, several of the encoders of FIG. 1 may be provided with inputting a spatially non-decimated and increasingly spatially decimated versions of an input signal into these spatial layer encoders. A redundancy among those layers could be exploited by using a reconstructed representation of a lower spatial resolution layer as a prediction for the next higher spatial resolution layer. The fine granular quality scalability could be implemented, for example, in the residual encoding means 106 and the residual decoding means 208, respectively, by accordingly encoding the transform coefficient levels in layers of increasing quantization resolution, or layers corresponding to a decreasing quantization step size so that the transformation coefficient levels are derivable from a summation of the contributions of the individual FGS layers.

Thus, the above embodiments enable an extension of scalable video coding toward scalability in terms of sample bit depth and/or chroma sampling format, thereby enabling an encoder to store a base-quality representation of a video sequence, which can be decoded by any legacy video decoder, together with an enhancement signal for higher bit depth and/or reduced chroma subsampling, which is ignored by legacy video decoders. For example, the base quality representation could contain an 8-bit version of the video sequence, while the high quality enhancement signal contains a "refinement" to a 10-bit version of the same sequence.

Thus, in other words, the above embodiments describe a video coder (encoder/decoder) for coding (encoding/decoding) a layered representation of a video signal comprising, for example, a standardized video coding method for coding a base-quality layer, a prediction method for performing a prediction of the high-quality enhancement layer signal by using the reconstructed base-quality signal, and a residual coding method for coding of the prediction residual of the high-quality enhancement layer signal. In this video coder, the prediction may be performed by using a mapping function from the dynamic range associated with the base-quality layer to the dynamic range associated with the high-quality enhancement layer. In particular, the prediction may be performed by scaling and clipping the sample values x of the base-quality layer according to the formula min $(2^{M-N}x, 2^M-1)$, where the sample values x of the base-quality layer are represented with a bit depth of N and the sample values of the high-quality enhancement layer are represented with a bit depth of M with M>N. Other alternatives have been indicated above. Alternatively, the prediction may be performed by using a piece-wise linear mapping with a given number of interpolation points transmitted as a side information. Even alternatively, the prediction may be performed by using a value of the base-quality signal sample for indexing a look-up table, which contains the corresponding high-quality sample values and which may also be transmitted as side information. The residual coding may be performed along the H.264/MPEG4-AVC. The color-space representation of the video signal may be given in the form of one luma and two chroma components with a chroma sampling format of the base-quality layer and high-quality enhancement layer being 4:2:0 and 4:2:2, respectively, and the prediction of the chroma sample values of the high-quality enhancement layer signal may be performed by using a spatial interpolation filter applied to the chroma sample values of the base quality layer. Similarly, the color-space representation of the video signal may be given in the form of one luma and two chroma components with a chroma sampling format of the base-quality layer and high-quality enhancement layer being 4:2:2 and 4:4:4, respectively, and the prediction of the chroma sample values of the high-quality enhancement layer signal may be performed by using a spatial interpolation filter applied to the chroma sample values of the base-quality layer. Accordingly, the color-spatial representation of the video signal may be given in the form of one luma and two chroma components with a chroma sampling format of the base-quality layer and high-quality enhancement layer being 4:2:0 and 4:4:4, respectively, and the prediction of the chroma sample values of the high-quality enhancement layer signal may be performed by using a spatial interpolation filter applied to the chroma sample values of the base-quality layer. In case of the base-quality layer and high-quality enhancement layer being 4:2:0 and 4:2:2, respectively, the spatial interpolation filter used may be a linear interpolation filter vertically applied to the chroma sample values of the base-quality layer. Similarly, if the base-quality layer and the high-quality enhancement layer are 4:2:2 and 4:4:4, respectively, a linear interpolation filter may horizontally applied to the chroma sample values of the base-quality layer, and, if the base-quality layer and the high-quality enhancement layer are 4:2:0 and 4:4:4, respectively, the spatial interpolation filter may be a bilinear interpolation applied to the chroma sample values of the base-quality layer. Further, if the base-quality layer and the high-quality enhancement layer are 4:2:0 and 4:2:2, respectively, the spatial interpolation filter may be a 6-tap half-pel interpolation filter as specified by H.264/MPEG4-AVC vertically applied to the chroma sample values of the base-quality layer. Similarly, if the base-quality layer and the high-quality enhancement layer are 4:2:2 and 4:4:4, respectively, the spatial interpolation filter may be the 6-tap half-pel interpolation filter specified by H.264/MPEG4-AVC horizontally applied to the chroma sample values of the base-quality layer. If the base-quality layer and the high-quality enhancement layer are 4:2:0 and 4:4:4, respectively, the spatial interpolation filter may be realized by a 6-tap half-pel interpolation filter specified by H.264/MPEG4-AVC separably applied to the chroma sample values of the base-quality layer. Similarly, in case of base-quality layer and high-quality enhancement layer being 4:2:0 and 4:2:2, respectively, an 8-tap half-pel interpolation filter specified by MPEG4-Part2 visual, advanced simple profile, may be vertically applied to the chroma sample values of the base-quality layer in the prediction modules 134, and 232, respectively. Similarly, if the base-quality layer and the high-quality enhancement layer are 4:2:2 and 4:4:4, respectively, the 8-tap half-pel interpolation filter specified by MPEG4 Part2 visual, Advanced Simple Profile, may be horizontally applied to the chroma sample values of the base-quality layer. If the base-quality layer and the high-quality enhancement layer are 4:2:0 and 4:4:4, respectively, an 8-tap half-pel interpolation filter specified by MPEG4 Part2 visual, advanced simple profile, may be separably applied to the chroma sample values of the base-quality layer. A FIR interpolation filter as the spatial interpolation filter is also possible. For example, if the base-quality layer and the high-quality enhancement layer are 4:2:0 and 4:2:2, respectively, a FIR interpolation filter may be vertically applied to the chroma sample values of the base-quality layer, where the filter taps of the FIR filter may be transmitted as side information. Similarly, if the base-quality layer and the high-quality enhancement layer are 4:2:2 and 4:4:4, respectively, a FIR interpolation filter may be horizontally applied to the chroma sample values of the base-quality layer, where the filter taps of the FIR filter are transmitted as side information. If the base-quality layer and the high-quality enhancement layer are 4:2:0 and 4:4:4, respectively, a FIR interpolation filter may be separably applied to the chroma sample values of the base-quality layer, where the filter taps of the FIR filter may be transmitted as side information. It is also possible that the color-space representation of the base-quality video signal is given in the form of one luma and two chroma components with a chroma sub-sampling format of 4:2:0 or 4:2:2 and wherein the high-quality video signal has a chroma sampling format of 4:4:4, but a color-space representation that is different from that of the base-quality representation. In that case, the prediction of the chroma sample values of the high-quality enhancement layer signal within modules 134 and 232, respectively, may be performed by first applying a spatial interpolation filter to the chroma sample values of the base-quality layer as described above, and subsequently color-transforming the resulting upsampled base-quality signal to the color-space of the high-quality enhancement layer.

Depending on an actual implementation, the in inventive coding scheme can be implemented in hardware or in software. Therefore, the present invention also relates to a computer program, which can be stored on a computer-readable medium such as a CD, a disc or any other data carrier. The present invention is, therefore, also a computer program having a program code which, when executed on a computer, performs the inventive method described in connection with the above figures. In particular, the implementations of the means and modules in FIGS. 1 and 2 may comprise sub-routines running on a CPU, circuit parts of an ASIC or the like, for example.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

What is claimed:

1. A decoder for decoding information from a datastream to reconstruct a picture, which is partitioned into slices, the decoder comprising:

an entropy decoder configured to entropy decode, using a processor, the slices based on wavefront parallel processing (WPP) in which a current slice of the slices is entropy decoded according to one of at least two modes, wherein the entropy decoder is configured to:
in accordance with a first mode of the at least two modes, decode data related to the current slice using context adaptive entropy decoding to obtain a residual signal, wherein the context adaptive entropy decoding includes deriving contexts across slice boundaries and initializing a symbol probability associated with the current slice depending on a saved state of the symbol probability of a previously decoded slice, wherein, in initializing the symbol probability associated with the current slice in accordance with the first mode, the entropy decoder is configured to:
responsive to a determination that a first coding block associated with the current slice is the first coding block from the left end of a first row of the picture in accordance with a raster scan order, initialize the symbol probability associated with the current slice based on the saved symbol probability as acquired in context adaptive entropy decoding the previously decoded slice up to the second coding block from the left end of a second row of the picture, wherein the second row is associated with the previously decoded slice, and otherwise, initialize the symbol probability associated with the current slice based on a symbol probability as acquired at the end of context adaptive entropy decoding the previously decoded slice, and in accordance with a second mode of the at least two modes, decode data related to the current slice using context adaptive entropy decoding to obtain a residual signal, wherein the context adaptive entropy decoding includes restricting the derivation of the contexts so as to not cross the slice boundaries and an initialization of the symbol probabilities independent of a previously decoded slice, and save the symbol probability as acquired in context adaptive entropy decoding the previously decoded slice up to the second coding block in the second row associated with the previously decoded slice in accordance with the raster scan order;

a predictor configured to generate, using the processor, a prediction signal based on prediction parameters related to the current slice from the datastream; and a reconstruction module configured to reconstruct, using the processor, a portion of the picture related to the current slice based on the residual signal and the prediction signal.

2. The decoder according to claim 1, where the picture is partitioned in coding blocks arranged in rows and columns and having the raster scan order defined among each other, and the decoder is configured to associate each slice with a continuous subset of the coding blocks in the raster scan order so that the subsets follow each other along the raster scan order in accordance with a slice order.

3. The decoder according to claim 1, wherein, in initializing the symbol probability associated with the current slice in accordance with the first mode, the entropy decoder is configured to: responsive to a determination that the first coding block associated with the current slice is not the first coding block in the first row, initialize the symbol probability associated with the current slice based on a symbol probability as acquired at the end of context adaptive entropy decoding the previously decoded slice.

4. The decoder according to claim 1, wherein the entropy decoder is configured to be responsive to a syntax element portion within the current slice of the slices, the syntax element portion indicating which of the first and second modes to use for decoding.

5. The decoder according to claim 1, wherein the entropy decoder is configured to be responsive to a generic syntax element in the datastream so as to operate in one of at least two generic operating modes, with, according to a first generic operating mode, performing the responsiveness to the syntax element portion for each slice, and, according to a second generic operating mode, using a different one of the at least two modes other than the first mode.

6. The decoder according to claim 1, wherein the entropy decoder is configured to according to the first and second modes, continue continuously updating the symbol probabilities from a beginning to an end of the current slice.

7. The decoder according to claim 1, wherein the entropy decoder is configured to save symbol probabilities as acquired in context adaptive entropy decoding the previously decoded slice up to an end of the previously decoded slice.

8. The decoder according to claim 1, wherein the entropy decoder is configured to, in the first and second mode, restrict the predictive decoding within tiles into which the picture is sub-divided.

9. The decoder according to claim 1, wherein the entropy decoder is configured to, in accordance with the first of the at least two modes, copy for the current slice a portion of a slice header syntax from a preceding slice decoded in the second mode.

10. The decoder according to claim 1, wherein each slice comprises a start syntax portion indicating a position within the picture at which the entropy decoding of the respective slice begins, the entropy decoder being configured to identify entry points of WPP substreams associated with the slices using the slices' start syntax portions.

11. The decoder according to claim 10, wherein the entropy decoder is configured to parallel decode the WPP substreams in a staggered manner with sequentially commencing the decoding of the WPP sub streams in accordance with the slice order.

12. An encoder for encoding a picture into a datastream, wherein the picture is partitioned into slices, the encoder comprising:

a residual module configured to generate, using a processor, a residual signal related to a current slice of the slices of the picture;

a predictor configured to generate, using the processor, prediction parameters based on a prediction signal, wherein the prediction parameters are encoded into the datastream; and an entropy encoder configured to entropy encode, using the processor into the datastream, the slices based on wavefront parallel processing (WPP) in which the residual signal related to the current slice is entropy encoded according to one of at least two modes, wherein the entropy encoder is configured to:

if the current slice is to be coded in accordance with a first mode of the at least two modes, encode the residual signal using context adaptive entropy encoding including deriving contexts across slice boundaries and initializing a symbol probability associated with the current slice depending on a saved state of the symbol probability of a previously encoded slice, wherein, in initializing the symbol probability associated with the current slice in accordance with the first mode, the entropy encoder is configured to:

responsive to a determination that a first coding block associated with the current slice is the first coding block from the left end of a first row of the picture in accordance with a raster scan order, initialize the symbol probability associated with the current slice based on the saved symbol probability as acquired in context adaptive entropy encoding the previously encoded slice up to the second coding block from the left end of a second row of the picture, wherein the second row is associated with the previously encoded slice, and otherwise, initialize the symbol probability associated with the current slice based on a symbol probability as acquired at the end of context adaptive entropy encoding the previously encoded slice, and if the current slice is to be coded in accordance with a second mode of the at least two modes, encode the residual signal using context adaptive entropy encoding with restricting the derivation of the contexts so as to not cross the slice boundaries and initializing the symbol probabilities independent of any previously encoded slice, and save the symbol probability as acquired in context adaptive entropy encoding the previously encoded slice up to the second coding block in the second row associated with the previously encoded slice in accordance with the raster scan order.

13. The encoder according to claim 12, where the picture is partitioned in coding blocks arranged in rows and columns and having the raster scan order defined among each other, and the encoder is configured to associate each slice with a continuous subset of the coding blocks in the raster scan order so that the subsets follow each other along the raster scan order in accordance with a slice order.

14. The encoder according to claim 12, wherein, in initializing the symbol probability associated with the current slice in accordance with the first mode, the entropy encoder is configured to: responsive to a determination that the first coding block associated with the current slice is not the first coding block in the first row, initialize the symbol probability associated with the current slice based on a symbol probability as acquired at the end of context adaptive entropy encoding the previously encoded slice.

15. The encoder according to claim 12, wherein the entropy encoder is configured code a syntax element portion within the current slice of the slices, the syntax element portion indicating which of the first and second modes to use for encoding.

16. The encoder according to claim 12, wherein the entropy encoder is configured to determine a generic syntax element and write same into the datastream with operating in one of at least two generic operating modes depending on the generic syntax element, namely, with, according to a first generic operating mode, performing coding the syntax element portion for each slice, and, according to a second generic operating mode, inevitably using a different one of the at least two modes other than the first mode.

17. The encoder according to claim 13, wherein the entropy encoder is configured to according to the first and second modes, continue continuously updating the symbol probabilities from a beginning to an end of the current slice.

18. The encoder according to claim 12, where the entropy encoder is configured to save symbol probabilities as acquired in context adaptive entropy encoding the previously encoded slice up to the end of the previously encoded slice.

19. The encoder according to claim 12, where the entropy encoder is configured to, in the first and second mode, restrict the predictive encoding within tiles into which the picture is sub-divided.

20. The encoder according to claim 12, wherein each slice comprises a start syntax portion indicating a position within the picture at which the entropy encoding of the respective slice begins, the entropy encoder being configured to identify entry points of WPP substreams associated with the slices using the slices' start syntax portions.

21. A method for decoding information from a datastream to reconstruct a picture, which is partitioned into slices, the method comprising:
  entropy decoding the slices based on wavefront parallel processing (WPP) in which a current slice of the slices is entropy decoded according to one of at least two modes, wherein the entropy decoding includes:
    in accordance with a first mode of the at least two modes, decoding data related to the current slice from the datastream using context adaptive entropy decoding to obtain a residual signal, the context adaptive entropy decoding including deriving contexts across slice boundaries and initializing a symbol probability associated with the current slice depending on a saved state of the symbol probability of a previously decoded slice, wherein, in initializing the symbol probability associated with the current slice in accordance with the first mode, the entropy decoding includes:
      responsive to a determination that a first coding block associated with the current slice is the first coding block from the left end of a first row of the picture in accordance with a raster scan order, initializing the symbol probability associated with the current slice based on the saved symbol probability as acquired in context adaptive entropy decoding the previously decoded slice up to the second coding block from the left end of a second row of the picture, wherein the second row is associated with the previously decoded slice, and
      otherwise, initializing the symbol probability associated with the current slice based on a symbol probability as acquired at the end of context adaptive entropy decoding the previously decoded slice, and
    in accordance with a second mode of the at least two modes, decoding data related to the current slice from the datastream using context adaptive entropy decoding to obtain a residual signal, the context adaptive entropy decoding including restricting the derivation of the contexts so as to not cross the slice boundaries and initializing the symbol probabilities independent of a previously decoded slice, and saving the symbol probability as acquired in context adaptive entropy decoding the previously decoded slice up to the second coding block in the second row associated with the previously decoded slice in accordance with the raster scan order;
  generating a prediction signal based on prediction parameters related to the current slice from the datastream; and
  reconstructing a portion of the picture related to the current slice based on the residual signal and the prediction signal.

22. The method according to claim 21, where the picture is partitioned in coding blocks arranged in rows and columns and having the raster scan order defined among each other, and the method further comprises associating each slice with a continuous subset of the coding blocks in the raster scan order so that the subsets follow each other along the raster scan order in accordance with a slice order.

23. The method according to claim 21, wherein, in initializing the symbol probability associated with the current slice in accordance with the first mode, the entropy decoding includes: responsive to a determination that the first coding block associated with the current slice is not the first coding block in the first row, initializing the symbol probability associated with the current slice based on a symbol probability as acquired at the end of context adaptive entropy decoding the previously decoded slice.

24. The method according to claim 21, wherein the entropy decoding is responsive to a generic syntax element in the datastream so as to operate in one of at least two generic operating modes, with, according to a first generic operating mode, performing the responsiveness to the syntax element portion for each slice, and, according to a second generic operating mode, using a different one of the at least two modes other than the first mode.

25. The method according to claim 21, wherein the entropy decoding includes, in accordance with the first and second modes, continuously updating the symbol probabilities from a beginning to an end of the current slice.

26. The method according to claim 21, wherein the entropy decoding includes saving symbol probabilities as acquired in context adaptive entropy decoding the previously decoded slice up to the end of the previously decoded slice.

27. The method according to claim 21, wherein the entropy decoding includes, in accordance with the first of the at least two modes, copying for the current slice a portion of a slice header syntax from a preceding slice decoded in the second mode.

28. The method according to claim 21, wherein each slice comprises a start syntax portion indicating a position within the picture at which the entropy decoding of the respective slice begins, the entropy decoding including identifying entry points of WPP substreams associated with the slices using the slices' start syntax portions.

29. A non-transitory computer-readable medium for storing data associated with a video, comprising:
a data stream stored in the non-transitory computer-readable medium, the data stream comprising encoded information related to a picture of a video, wherein the picture is partitioned in units of slices, wherein the encoded information is coded into the data stream for storing in the non-transitory computer-readable medium by operations including:
generating a residual signal related to a current slice of the slices of the picture;
generating prediction parameters based on a prediction signal, wherein the prediction parameters are encoded into the datastream;
entropy encoding the slices based on wavefront parallel processing (WPP) in which the residual signal related to the current slice is entropy encoded according to one of at least two modes, wherein the entropy encoding includes:
if the current slice is to be coded in accordance with a first mode of the at least two modes, encoding the residual signal using context adaptive entropy encoding including deriving contexts across slice boundaries and initializing a symbol probability associated with the current slice depending on a saved state of the symbol probability of a previously encoded slice, wherein, in initializing the symbol probability associated with the current slice in accordance with the first mode, the entropy encoding includes:
responsive to a determination that a first coding block associated with the current slice is the first coding block from the left end of a first row of the picture in accordance with a raster scan order, initializing the symbol probability associated with the current slice based on the saved symbol probability as acquired in context adaptive entropy encoding the previously encoded slice up to the second coding block from the left end of a second row of the picture, wherein the second row is associated with the previously encoded slice, and
otherwise, initializing the symbol probability associated with the current slice based on a symbol probability as acquired at the end of context adaptive entropy encoding the previously encoded slice, and
if the current slice is to be coded in accordance with a second mode of the at least two modes, encoding the residual signal using context adaptive entropy encoding with restricting the derivation of the contexts so as to not cross the slice boundaries and initializing the symbol probabilities independent of any previously encoded slice, and saving the symbol probability as acquired in context adaptive entropy encoding the previously encoded slice up to the second coding block in the second row associated with the previously encoded slice in accordance with the raster scan order.

30. The non-transitory computer-readable medium according to claim 29, wherein the operations include, in initializing the symbol probability associated with the current slice in accordance with the first mode, the entropy encoding includes: responsive to a determination that the first coding block associated with the current slice is not the first coding block in the first row, initializing the symbol probability associated with the current slice based on a symbol probability as acquired at the end of context adaptive entropy encoding the previously encoded slice.

* * * * *